United States Patent
Coile et al.

(12) 
(10) Patent No.: US 6,176,733 B1
(45) Date of Patent: ***Jan. 23, 2001

(54) SYSTEM AND METHOD FOR DIRECT COMMUNICATION WITH A BACKUP NETWORK DEVICE VIA A FAILOVER CABLE

(75) Inventors: Brantley W Coile, Athens; James A. Jordan, Lawrenceville, both of GA (US)

(73) Assignee: Cisco Technology, Inc., San Jose, CA (US)

( * ) Notice: Under 35 U.S.C. 154(b), the term of this patent shall be extended for 0 days.

This patent is subject to a terminal disclaimer.

(21) Appl. No.: 09/389,651

(22) Filed: Sep. 2, 1999

Related U.S. Application Data

(63) Continuation of application No. 08/920,211, filed on Aug. 25, 1997, now Pat. No. 5,989,060.

(51) Int. Cl.[7] ......................................................... H01R 3/00
(52) U.S. Cl. ............................................. 439/489; 439/502
(58) Field of Search ...................................... 439/489, 502, 439/578, 639, 640, 650

(56) References Cited

U.S. PATENT DOCUMENTS 5,989,060 * 11/1999 Coile et al. ........................... 439/489

* cited by examiner

*Primary Examiner*—Lincoln Donovan
*Assistant Examiner*—Eugene G. Byrd
(74) *Attorney, Agent, or Firm*—Ritter, Van Pelt & Yi, LLP

(57) ABSTRACT

A system and method are disclosed for providing a failover for designating a primary network device and a backup network device and providing direct communication between the primary network device and the backup network device. The cable includes a plurality of conductive wires having a primary end and a backup end. A primary connector is connected to the plurality of conductive wires at the primary end of the plurality of conductive wires. The primary connector has a primary plug driver pin and a primacy select pin, and the primary plug driver pin is connected to the primacy select pin. A backup connector is connected to the plurality of conductive wires at the backup end of the plurality of conductive wires, the backup connector has a grounded pin and a backup select pin and the backup grounded pin is connected to the backup select pin. Thus, the primary end of the failover cable is distinguishable from the backup end of the failover cable.

9 Claims, 6 Drawing Sheets mother board                                    DB - 15   connector

SYSTEM AND METHOD FOR DIRECT COMMUNICATION WITH A BACKUP NETWORK DEVICE VIA A FAILOVER CABLE

CROSS REFERENCE TO RELATED APPLICATIONS

This application is a continuation of U.S. patent application Ser. No. 08/920,211, filed Aug. 25, 1997 entitled, "System and Method for Direct Communication with a Backup Network Device via a Failover Cable" now U.S. Pat. No. 5,989,060 which is herein incorporated by reference, which is a continuation in part of U.S. patent application Ser. Nos. 08/850,248, 08/850,730 and 08/850,836 which are incorporated herein by reference for all purposes.

BACKGROUND OF THE INVENTION

1. Field of the Invention

The present invention relates generally to methods and apparatuses for direct communication with a backup network device via a failover cable. Specifically, the present invention provides in one embodiment a failover cable for direct communication between two network devices wherein one of the network devices serves as a backup for the other network device. The failover cable includes a primary end which terminates in a primary connector and a backup end which terminates in a backup connector. The failover cable includes a primacy selection loop at the primary end that identifies the primary end. Which network device is primary and which network device is secondary is determined by the end of the failover cable that is plugged in to each network device. In addition, the failover cable includes a local plug detect loop that provides verification that the cable is plugged in to a local socket. When connected to a properly configured remote socket, the cable and remote socket include a remote plug detect loop that provides verification that the cable is plugged in to a properly configured remote socket.

2. Description of the Related Art

Services provided over networks, intranets, and internets have been increasing in complexity. As a result, increasingly complex schemes have been developed to respond to client generated network traffic and service requests. In some of these schemes, a single device is placed on the network that is responsible to direct packets to other devices or to filter packets that are bound for a number of other devices for some purpose such as security or load balancing. Such devices, when implemented, are critical to the operation of a network because they often represent a single point of failure that may prevent either the entire network or a substantial portion of the network from functioning.

One such critical device is a Local Director as described in U.S. patent application Ser. Nos. 08/850,248, 08/850,730 and 08/850,836 (Attorney Docket Nos. CISCP005, CISCP007, and CISCP008) which were incorporated by reference above. In one implementation, the Local Director is a device for spreading connections made by clients to a given IP address among a number of servers. The Local Director includes a session distribution scheme that efficiently distributes the connection load among a group of servers by determining which server available to it is likely to be able to efficiently handle the load.

In a forward multiplexing mode, the Local Director not only distributes connections for a single IP address to many network devices, but also distributes connections for many different IP addresses to different ports of a single network device that runs applications that service connections for the different IP addresses. The Local Director may implement a large number of virtual network devices which service connections using a set of physical network devices that are made available to the Local Director. The system is an especially robust one because certain physical network devices can be configured as backups for other physical network devices that support a virtual network device. In fact, in one embodiment, virtual network devices that each access a group of physical network devices to handle connections may be defined as backups for each other.

The flexibility of the Local Director in selecting different physical or virtual network devices to handle incoming connection requests is an advantage since failure of individual network devices will not seriously degrade network performance so long as other physical network devices available to the Local Director are capable of assuming more of the load. On the other hand, the presence of the Local Director on the network as a central distribution point that distributes connections among a large number of physical network devices could present a significant danger for catastrophic system failure. The Local Director is a potential single point of failure that could prevent the use of potentially all of the servers connected to it. Such a single point of failure in a network system is unacceptable in many systems.

A reliable failover system for providing a backup for a Local Director is described in co-pending U.S. patent application Ser. No. 08/918,024 (Attorney Docket No CISCP011 filed concurrently herewith, which was previously incorporated by reference for all purposes. In the described system, network functions are transferred from an active network device to a standby device that is configured the same as the active device but does not become active until the active device fails. The active device and the standby device communicate with each other both over the network and over a separate failover cable. When a positive determination is made that the active device has failed, the backup device becomes active and assumes the duties of the failed active device.

This procedure occurs without the need for other network devices to change the MAC or IP address to which they are directing packets. The backup network device takes over the active MAC and IP addresses from the failed network device and supports connections made to those addresses. In certain situations, the failover cable is used by the backup to send a message to the active device that it has failed so that it will stop using the active MAC address and IP address and any switches in the system can learn that the network has been reconfigured and that the active MAC address has moved. In addition to communicating failure events, the failover cable also provides a reliable link on which the active network device downloads its initial configuration and subsequent configuration changes to the backup network device so that the backup network device can take over when necessary.

The failover cable thus represents a critical link between the primary network device and the secondary network device. It would therefore be desirable if the status of the cable, that is whether the cable is plugged or unplugged and which end is unplugged, could be readily determined so that the failover system could avoid switching to a backup or performing any other operation that relies on the failover cable. In addition, it would be desirable if the failover cable could provide a direct verification that each of the network devices has power so that power failures could be detected directly and instantly without requiring communication between the two network devices. Finally, it would be desirable if the failover cable could be used to elect which one of the network devices is the primary or backup device, so that other configuration of the network devices would not be required. Finally, it would be desirable if a failover cable could be provided that uses a standard cable configuration.

In view of the foregoing, there is a needed for a failover cable that could effectively provide the above described features.

SUMMARY OF THE INVENTION

Accordingly, the present invention provides a failover cable that provides a direct communication between an active network device and a backup network device. The failover cable includes a primary end which terminates in a primary connector and a backup end which terminates in a backup connector. The failover cable includes a primacy selection loop at the primary end that identifies the primary end. Which network device is primary and which network device is secondary is determined by the end of the failover cable that is plugged in to each network device. In addition, the failover cable includes a local plug detect loop that provides verification that the cable is plugged in to a local socket. When connected to a properly configured remote socket, the cable and remote socket include a remote plug detect loop that provides verification that the cable is plugged in to a properly configured remote socket.

It should be appreciated that the present invention can be implemented in numerous ways, including as a process, an apparatus, a system, a device, or a method. Several inventive embodiments of the present invention are described below.

In one embodiment, a failover cable is disclosed for designating a primary network device and a backup network device and providing direct communication between the primary network device and the backup network device. The cable includes a plurality of conductive wires having a primary end and a backup end. A primary connector is connected to the plurality of conductive wires at the primary end of the plurality of conductive wires. The primary connector has a primary plug driver pin and a primacy select pin, and the primary plug driver pin is connected to the primacy select pin. A backup connector is connected to the plurality of conductive wires at the backup end of the plurality of conductive wires, the backup connector has a grounded pin and a backup select pin and the backup grounded pin is connected to the backup select pin. Thus, the primary end of the failover cable is distinguishable from the backup end of the failover cable.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a schematic diagram showing the pin numbers of the DB-15 connector that are connected to the RS-232 pins of the RS-232 connector that is wired directly to the motherboard of a network device in a preferred embodiment.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
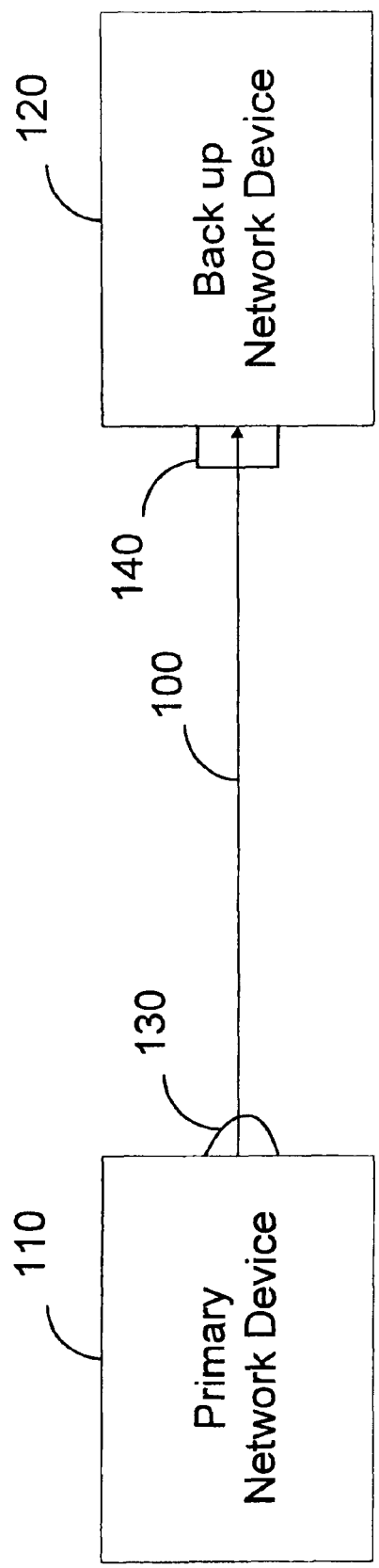
FIG. 1 is a block diagram illustrating a failover cable used in one embodiment of the present invention in a failover system.

FIG. 1 is a block diagram illustrating a failover cable used in one embodiment of the present invention in a failover system. A failover cable 100 connects primary network device 110 and backup network device 120. Failover cable 100 includes a primary end which terminates in a primary connector 130 and a backup end which terminates in a backup connector 140. The primary or backup status of the two network devices is determined by which end of failover cable 100 is plugged in to each network device at a given time. Thus, the network devices do not need to be internally configured in order to be set up as a backup network device or a primary network device.

In one embodiment, the failover cable connects to a modified RS-232 interface on a network device. The RS-232 interface is well known in the art and is described in Horowitz and Hill, *The Art of Electronics* Cambridge 1996, pp. 723 to 727, which is herein incorporated by reference for all purposes.

Figure 2A:
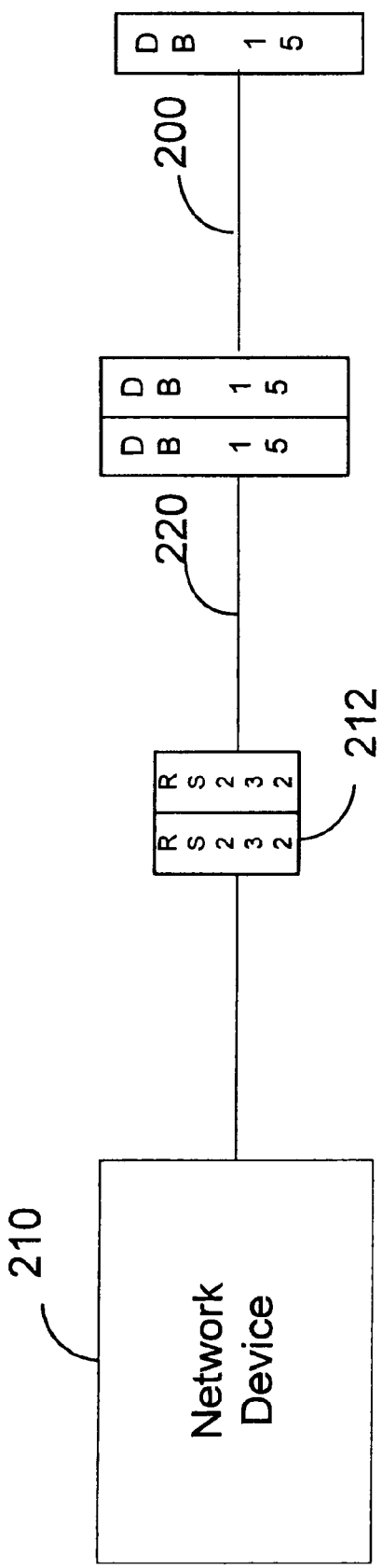
FIG. 2A is a block diagram illustrating how a failover cable is connected to a network device.

FIG. 2A is a block diagram illustrating how a failover cable 200 is connected to a network device 210. Network device 210 has a standard 9 pin RS-232 interface connector 212 connected to the motherboard of the network device. An interface adapter cable 220 connects on one end to the 9 pin RS-232 interface of the network device. The 9 pins are connected to a 15 pin interface adapter connector on the other end of interface adapter cable 220. Preferably, the 15 pin connector is a standard DB-15 connector. In one embodiment, 11 of the 15 pins are actually used. Failover cable 200 includes two DB-15 connectors, one at each end. In other embodiments, different pin arrangements are used. In certain embodiments, the 9 pin RS-232 motherboard interface is wired directly to a 15 pin connector without using an interface adaptor cable.

It should be noted that in the above discussion, it is not discussed which ends of the various connections are male or female. It is left to a person of ordinary skill to determine whether to use a male or female connector for each of the described connectors.

Figure 2B:
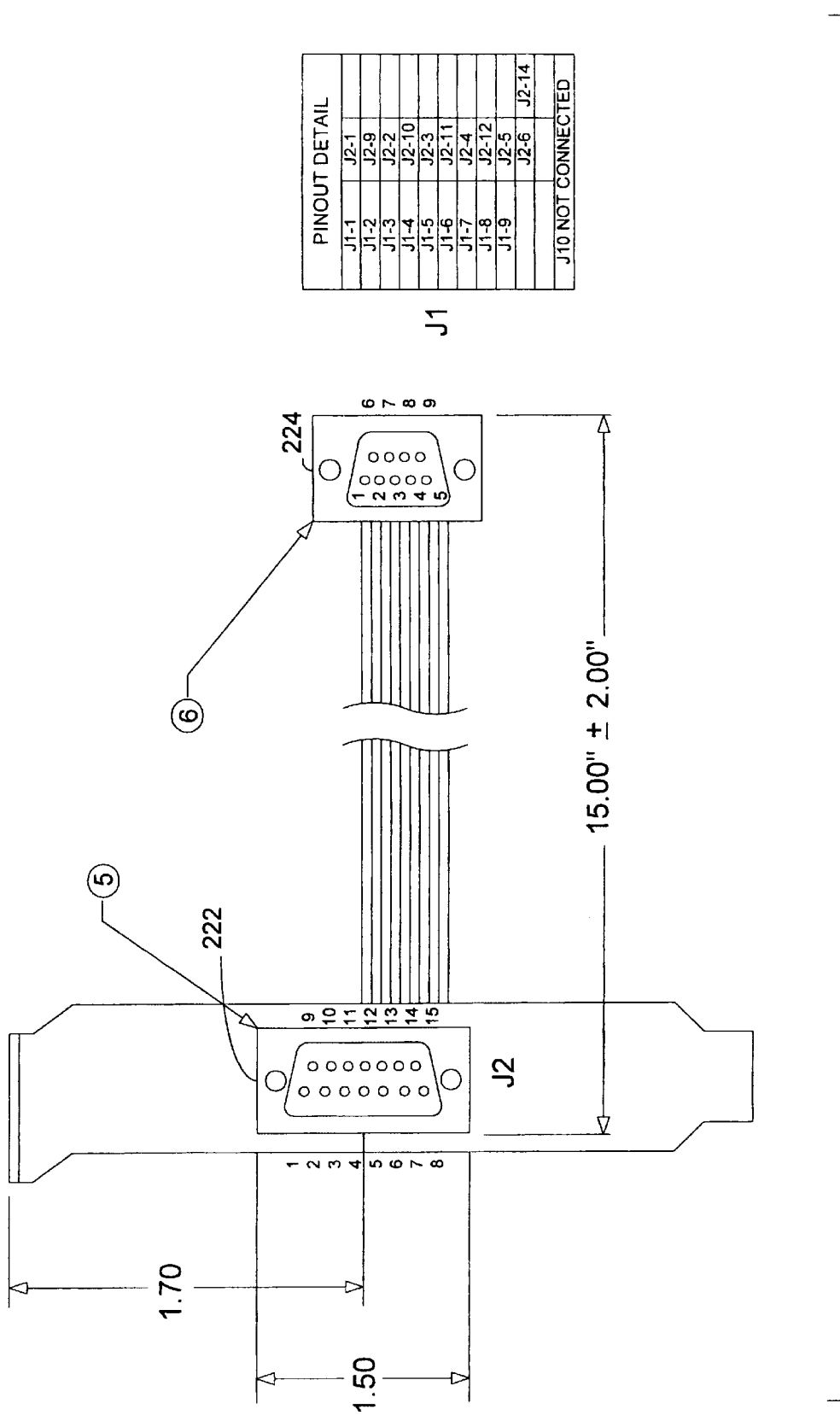
FIG. 2B is a schematic diagram illustrating interface adapter cable.
Figure 2C:
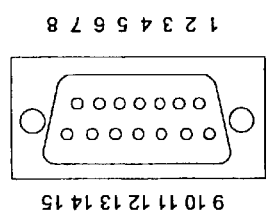
FIG. 2C is a schematic diagram illustrating failover cable.
Figure 2C:
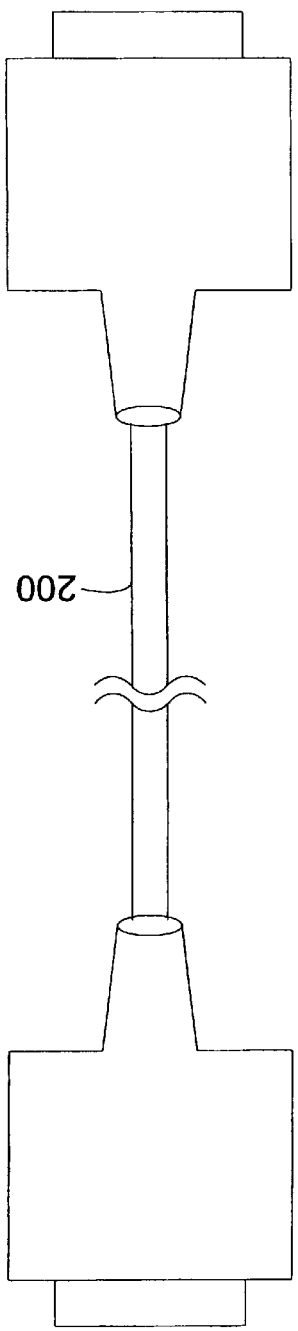

FIG. 2B is a schematic diagram illustrating interface adapter cable 220. Interface adapter cable 220 includes an internal connector 222 that connects to the network device RS-232 socket and an external connector 224 that connects to the failover cable. The pins on the internal connector are numbered according to the standard RS-232 convention and the pins on the external connector are numbered according to the standard DB-15 convention. FIG. 2C is a schematic diagram illustrating failover cable 200. Failover cable 200 includes a DB-15 connector on each end. The pin numbers for the DB-15 connector are shown again and are the same as shown in FIG. 2B.

It should be noted that in another embodiment, a DB-15 connector is wired directly to the motherboard of the network device.

FIG. 3 is a schematic diagram showing the pin numbers of the DB-15 connector that are connected to the RS-232 pins of the RS-232 connector that is wired directly to the motherboard of a network device in a preferred embodiment. The nine pins of the RS-232 connector are wired directly to nine pins of the DB-15 connector. In addition, pins 6 and 14 of the DB-15 connector are connected to provide a plug detect loopback as is described below.

Figure 4:
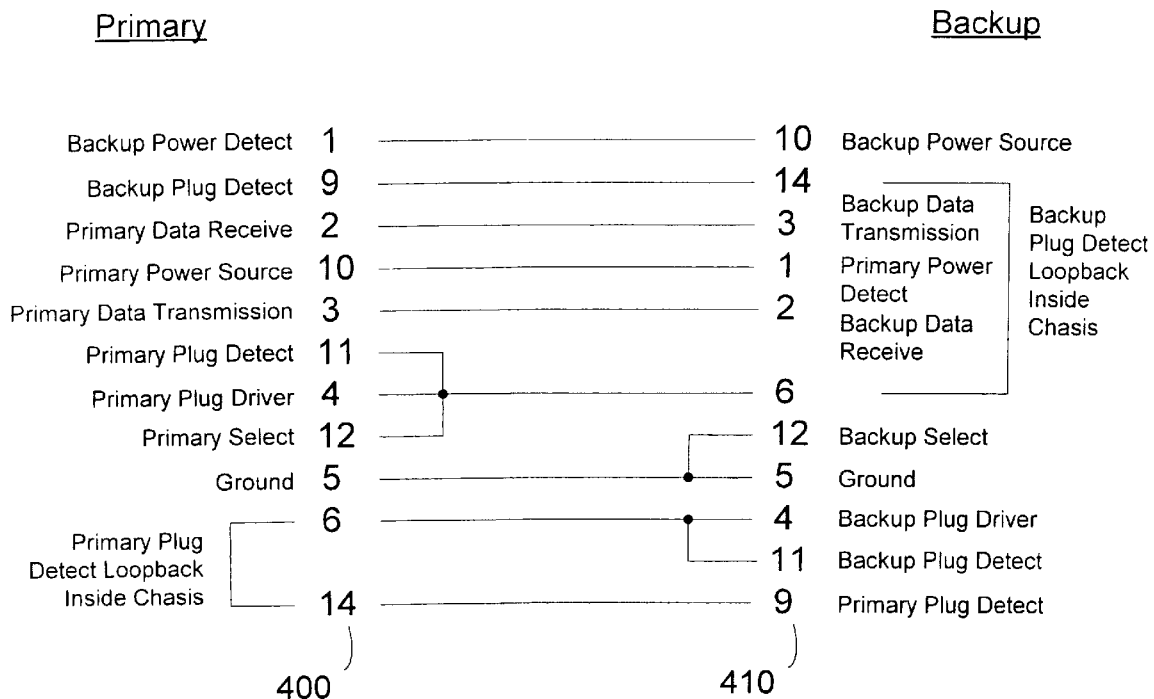
FIG. 4 is a schematic diagram illustrating the connections that are made to internal signals inside each network device on a primary end of the failover cable and a backup end of the failover cable.

FIG. 4 is a schematic diagram illustrating the connections that are made to internal signals inside each network device on a primary end 400 of the failover cable and a backup end 410 of the failover cable.

On the primary end, a backup power detecting circuit is connected to a backup power detect pin 1 of the primary connector. Pin 1 on the primary end is connected to a backup power source pin 10 on the backup end. Backup power is connected to pin 10 on the backup end. Similarly, a primary power detecting circuit is connected to Pin 1 on the backup end and primary power is connected to pin 10 on the primary end. Thus each network device can sense whether the power is up on the other network device using a power detecting circuit connected to pin 1. This allows each network device to immediately fail the other network device if power goes down to the other network device.

On the primary end, a foreign plug detect circuit is connected to a backup plug detect pin 9 on the primary connector. Pin 9 on the primary end is connected to a first backup plug detect loopback pin 14 on the backup end. Pin 14 on the backup end is connected to a second backup plug detect loopback pin 6 on the backup end via an internal loop within the chassis of the backup network device. Thus, the primary network device is able to determine whether or not the backup end of the failover cable is plugged into the backup network device. Similarly, primary plug detect pin 9 on the backup end is connected to a first primary plug detect loopback pin 14 on the primary end. Pin 14 on the primary end is connected to a second primary plug detect loopback pin 6 on the primary end via an internal loop within the chassis of the primary network device. Thus, each network device can determine whether or not the failover cable is plugged into the other. That determination can be used to change the failover procedure. In one embodiment, no failover is allowed unless the failover cable is plugged into both the primary and the backup network device.

The failover cable also provides a way for each network device to determine whether its own local end of the failover cable is plugged in. A plug driver pin 4 on each end is connected to a local plug driver inside each network device. Pin 4 is also connected directly to a plug detect pin 11 on the same end. A local plug detecting circuit may be connected to pin 11 to determine whether the local end of the failover cable is plugged in. Thus, each network device can quickly sense whether or not the cable is plugged in on each side.

On the primary end, pin 4 is also connected to a primary select pin 12. A primary detection circuit may be connected to pin 12. On the backup end, pin 12 is connected to pin 5 which is grounded. The grounded pin 12 is referred to as a backup select pin. On the primary end, pin 5 is also grounded but it is not connected to pin 12. Thus, each network device can determine whether it is connected to the primary end or the backup end of the failover cable based on whether the plug driver signal from pin 4 is detected on pin 12.

It should be noted that the plug driver signal in one embodiment is +12 volts. Other power source signals are preferably +12 volt also. In other embodiments, −12 volt is used or some other voltage determined according to a desired convention.

On the primary end, pin 2 is used to receive data and pin 3 is used to transmit data. Pin 2 on the primary end is connected to pin 3 on the backup end and pin 3 on the primary end is connected to pin 2 on the backup end. These connections are used in a failover scheme to send messages between the primary and backup network devices. In one embodiment, the configuration commands executed on the primary network device are mirrored to the backup network device.

Thus, the failover cable is configured to have a primary end and a secondary end. The network device that is plugged into each end can sense which end of the failover cable is plugged into it locally. This is preferably how each network device is designated as a primary network device or a backup network device. In addition, each network device can detect whether the failover cable is plugged in to the remote network device as well as whether the failover cable is plugged in locally. Each network device can also sense whether or not power is provided to the remote network device. Finally, two wires are provided for data to be sent and received by each network device.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A failover cable for designating a primary network device and a backup network device and providing direct communication between the primary network device and the backup network device, the cable comprising:

a plurality of conductive wires having a primary end and a backup end;

a primary connector connected to the plurality of conductive wires at the primary end of the plurality of conductive wires, the primary connector having a primary plug driver pin and a primacy select pin, wherein the primary plug driver pin is connected to the primacy select pin;

a backup connector connected to the plurality of conductive wires at the backup end of the plurality of conductive wires, the backup connector having a grounded pin and a backup select pin wherein the backup grounded pin is connected to the backup select pin;

whereby the primary end of the failover cable is distinguishable from the backup end of the failover cable.

2. A failover cable for designating a primary network device and a backup network device and providing direct communication between the primary network device and the backup network device as recited in claim 1 wherein the primary connector further includes a primary data transmission pin and a primary data receive pin and wherein the backup connector further includes a backup data transmission pin and a backup data receive pin, the primary data transmission pin being connected to the backup data receive pin via a first wire of the plurality of conductive wires and the primary data receive pin being connected to the backup data transmission pin via a second wire of the plurality of conductive wires whereby data is exchanged between the primary end and the backup end.

3. A method of selecting a primary and backup network device and providing direct communication between the primary network device and the backup network device comprising:

selecting the primary network device by reading a signal applied to primary plug driver pin on a primacy select pin;

selecting the backup network device by reading detecting a grounded signal on a backup select pin;

transmitting messages from a primary data transmit pin on the primary network device to a backup data receive pin on the backup network device; and transmitting messages from a backup data transmit pin on the backup network device to a primary data receive pin on the primary backup network device;

whereby the primary network device and the backup network device are selected and direct communication between the primary network device and the backup network device is enabled.

4. The method of selecting a primary and backup network device and providing direct communication between the primary network device and the backup network device as recited in claim 3, wherein a failover cable connects the primary network device to the backup network device, the failover cable having a primary connector on one end and a backup connector on the other end, the primary connector comprising a primary plug detect pin and a primary plug detect loop connecting the primary plug detect pin to the primary plug driver pin, the method further comprising determining that the primary connector is plugged in to the primary network device by detecting on the primary plug detect pin a signal applied to the primary plug driver pin.

5. The method of selecting a primary and backup network device and providing direct communication between the primary network device and the backup network device as recited in claim 4, wherein the backup connector comprises a backup plug detect pin and a backup plug detect loop connecting the backup plug detect pin to the backup plug driver pin, the method further comprising determining that the backup connector is plugged in to the backup network device by detecting on the backup plug detect pin a signal applied to the backup plug driver pin.

6. The method of selecting a primary and backup network device and providing direct communication between the primary network device and the backup network device as recited in claim 3, further comprising determining that the primary network device has power by detecting remotely at the backup network device a signal on a primary power detect pin connected electrically to a primary power source pin associated with the primary network device.

7. The method of selecting a primary and backup network device and providing direct communication between the primary network device and the backup network device as recited in claim 3, further comprising determining that the backup network device has power by detecting remotely at the primary network device a signal on a backup power detect pin connected electrically to a backup power source pin associated with the backup network device.

8. The method of selecting a primary and backup network device and providing direct communication between the primary network device and the backup network device as recited in claim 3, wherein a failover cable connects the primary network device to the backup network device, the failover cable having a primary connector on one end and a backup connector on the other end, the method further comprising determining that the primary connector is plugged in to the primary network device by applying a signal to a first pin in the backup connector and detecting the signal on a second pin in the backup connector.

9. The method of selecting a primary and backup network device and providing direct communication between the primary network device and the backup network device as recited in claim 3, wherein a failover cable connects the primary network device to the backup network device, the failover cable having a primary connector on one end and a backup connector on the other end, the method further comprising determining that the backup connector is plugged in to the backup network device by applying a signal to a first pin in the primary connector and detecting the signal on a second pin in the primary connector.

* * * * *